(12) United States Patent
Iwahara et al.

(10) Patent No.: US 7,167,338 B2
(45) Date of Patent: Jan. 23, 2007

(54) MAGNETIC DISK APPARATUS

(75) Inventors: Hiroyuki Iwahara, Kawasaki (JP); Yasuhiro Miura, Kawasaki (JP); Mitsuhiro Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/837,303

(22) Filed: Apr. 30, 2004

(65) Prior Publication Data

US 2005/0185328 A1    Aug. 25, 2005

Related U.S. Application Data

(62) Division of application No. 09/676,855, filed on Sep. 29, 2000, now Pat. No. 6,757,131.

(30) Foreign Application Priority Data

Dec. 9, 1999    (JP)  .................................. 11-349727

(51) Int. Cl.
*G11B 33/08* (2006.01)
(52) U.S. Cl. .................................................. 360/99.08
(58) Field of Classification Search .................... None
See application file for complete search history.

(56) References Cited

U.S. PATENT DOCUMENTS

| | | | |
|---|---|---|---|
| 4,003,265 A * | 1/1977 | Craig et al. .................... 74/5 R |
| 5,004,207 A | 4/1991 | Ishikawa et al. |
| 5,214,549 A | 5/1993 | Baker et al. |
| 5,483,397 A | 1/1996 | Gifford et al. |
| 5,537,270 A | 7/1996 | Morehouse et al. |
| 5,555,144 A * | 9/1996 | Wood et al. ............ 360/98.08 |
| 5,596,461 A | 1/1997 | Stefansky |
| 5,790,344 A | 8/1998 | Allen |
| 5,898,537 A | 4/1999 | Oizumi et al. |
| 5,931,050 A * | 8/1999 | Roach ........................ 464/180 |
| 6,011,670 A | 1/2000 | Balsley et al. |
| 6,236,532 B1 | 5/2001 | Yanagisawa |
| 6,351,344 B1 | 2/2002 | Krum et al. |
| 6,356,409 B1 * | 3/2002 | Price et al. .............. 360/98.07 |
| 6,418,612 B1 * | 7/2002 | Chuang et al. .......... 29/603.03 |
| 6,501,614 B1 | 12/2002 | Kang et al. |
| 6,504,674 B2 * | 1/2003 | Yoshida et al. .......... 360/99.12 |
| 6,529,345 B1 | 3/2003 | Butler et al. |
| 6,550,328 B1 * | 4/2003 | Horning et al. ................ 73/468 |
| 6,608,733 B2 * | 8/2003 | Elsing ...................... 360/99.08 |
| 6,624,968 B1 * | 9/2003 | Chessman et al. ....... 360/99.12 |
| 6,707,639 B1 * | 3/2004 | Pfeiffer et al. ........... 360/99.08 |

(Continued)

FOREIGN PATENT DOCUMENTS

JP    07-262748    10/1995

(Continued)

*Primary Examiner*—Angel Castro
(74) *Attorney, Agent, or Firm*—Greer, Burns & Crain, Ltd.

(57) ABSTRACT

A magnetic disk apparatus for reading and writing information to a magnetic disk including a motor for rotating the magnetic disk mounted thereon; a disk-shaped clamp for mounting the magnetic disk on the motor by screw fastening; and a C-shaped balancer for adjusting the rotary balance of the magnetic disk and mounted on the outer surrounding portion of the clamp, wherein the C-shaped balancer has a generally rectangular cross-section.

2 Claims, 8 Drawing Sheets

U.S. PATENT DOCUMENTS 6,741,418 B2 * 5/2004 Renken .................. 360/98.08

FOREIGN PATENT DOCUMENTS

| JP | 11-039786 | 2/1999 |
|----|-----------|--------|
| JP | 11-232862 | 8/1999 |
| JP | 11-238333 | 8/1999 |
| JP | 11-353788 | 12/1999 |

* cited by examiner

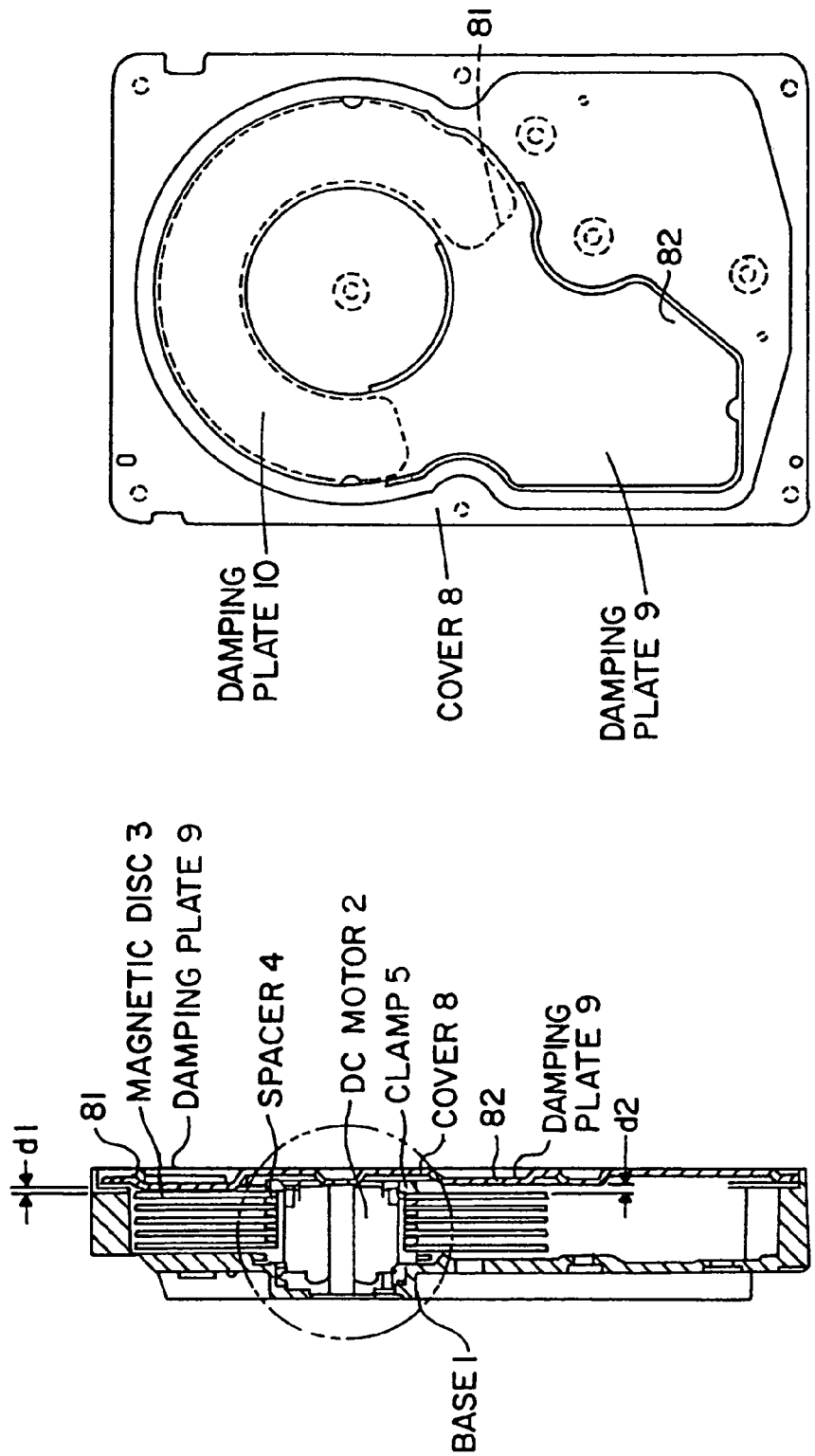

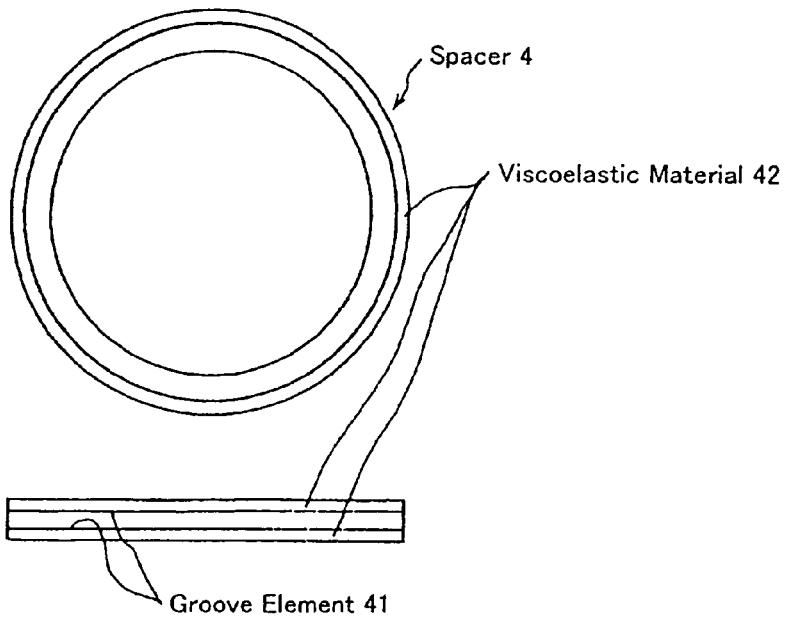
FIG. 5A
FIG. 5B
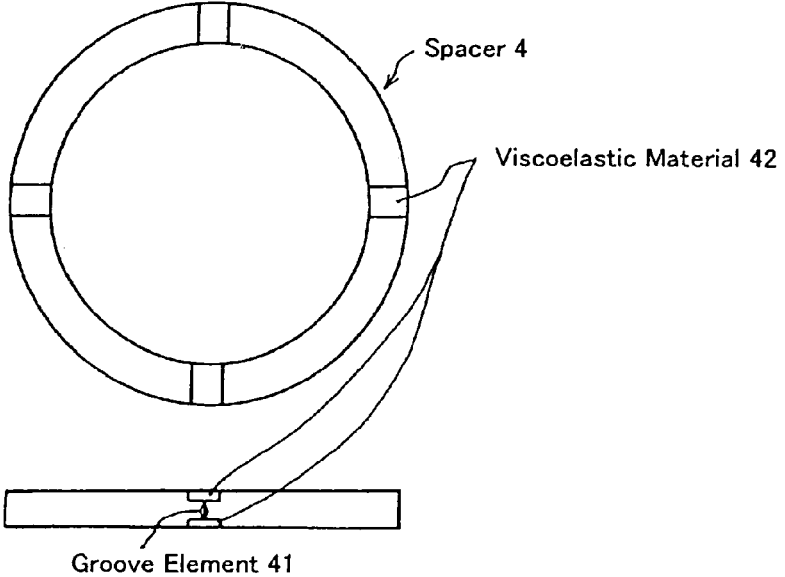
FIG. 6A
FIG. 6B

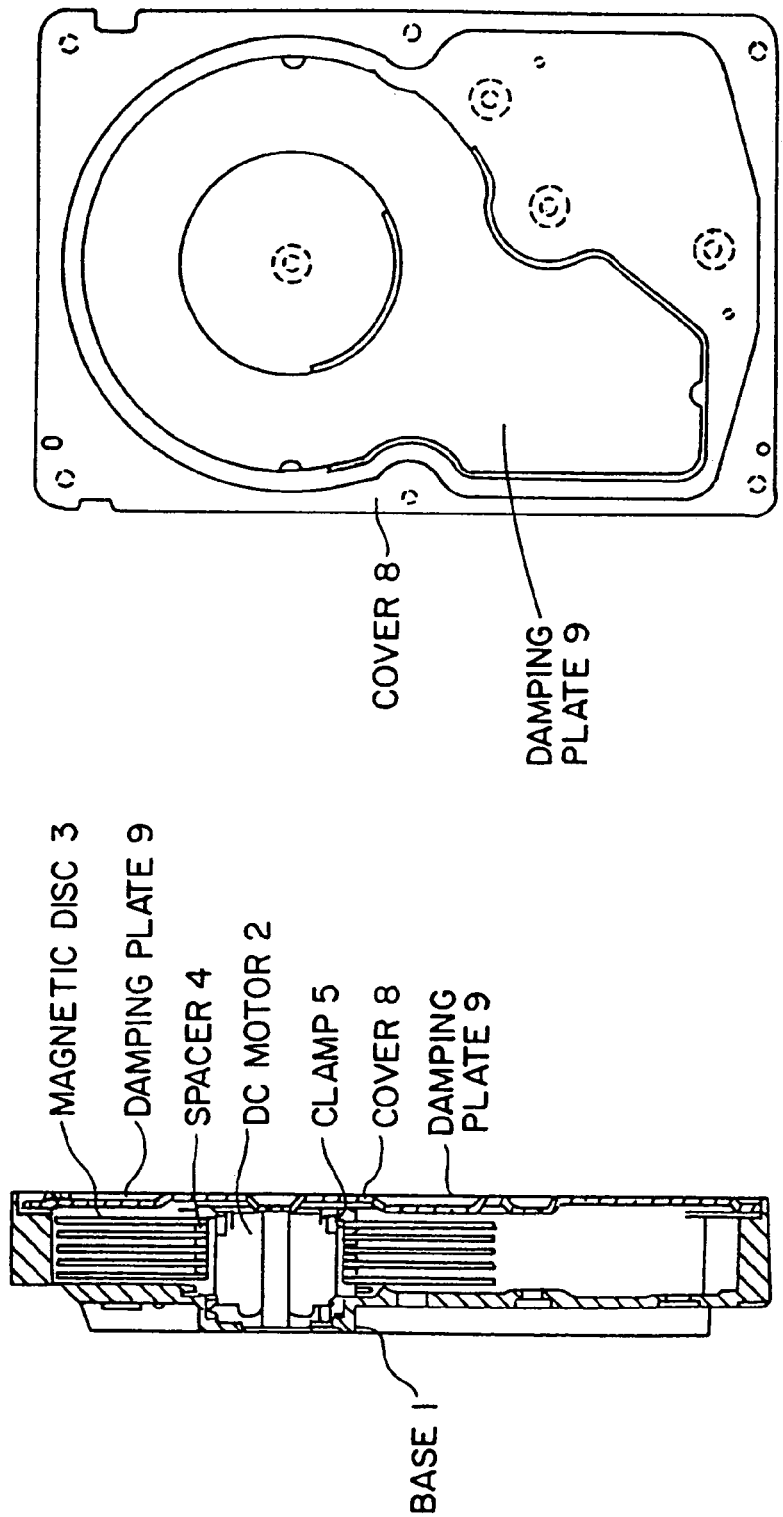

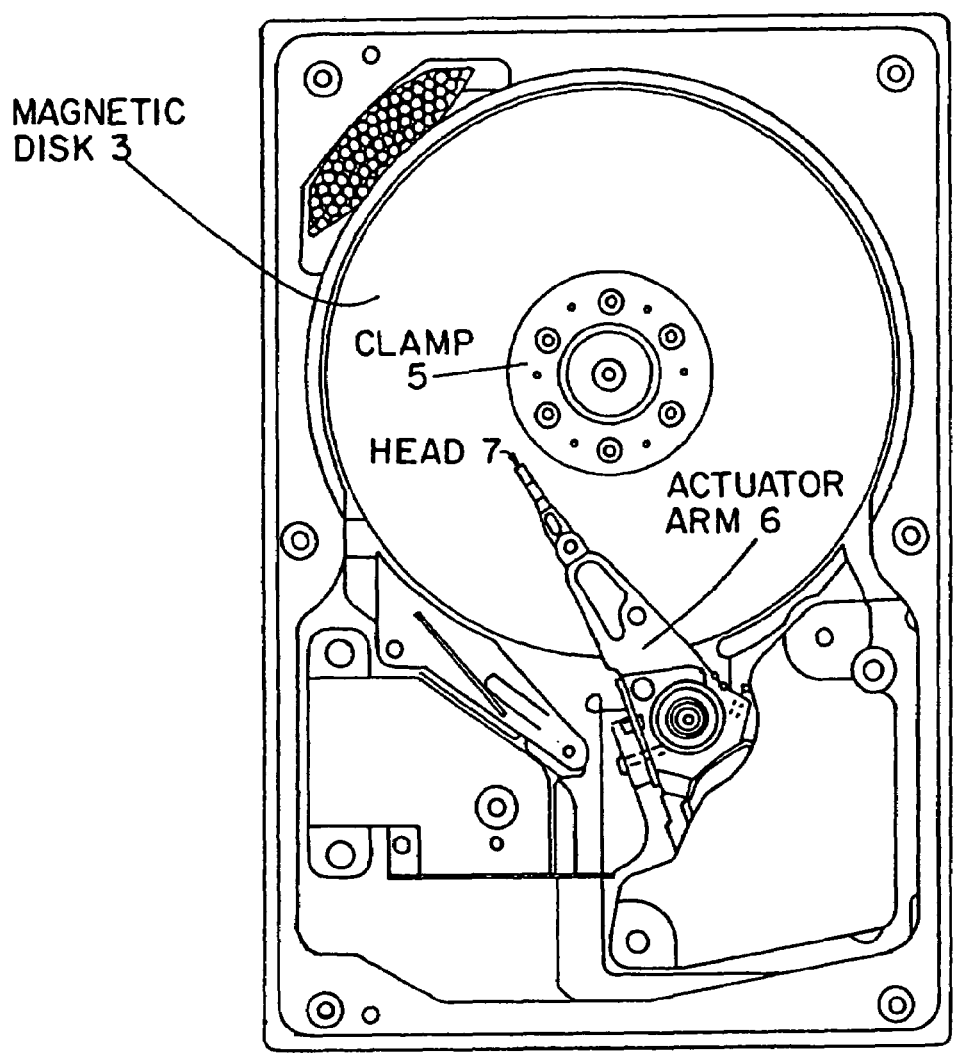
FIG. II
(PRIOR ART)

MAGNETIC DISK APPARATUS

This is a divisional, of application Ser. No. 09/676,855 now U.S. Pat. No. 6,757,131, filed Sep. 29, 2000.

BACKGROUND OF THE INVENTION

1. Field of the Invention

The present invention relates to an improvement in a magnetic disk apparatus for reading and writing information to a magnetic disk, used as a storage apparatus for a computer apparatus.

2. Description of the Related Art

FIGS. 10A and 10B are drawings showing a magnetic disk apparatus; a cross sectional view (FIG. 10A) and a view from above (FIG. 10B) are shown. Also, FIG. 11 is a view from above of the magnetic disk apparatus with the cover 8 in FIGS. 10A and 10b removed. In FIG. 10A, a DC motor 2 is mounted on the base 1. At least one magnetic disk 3 is mounted on the DC motor 2 so as to be capable of rotating about the center of the DC motor 2. In FIG. 10A, five magnetic disks 3, for example, with spacers 4 fitted between them, are pressed together by a screw fastening using a disk clamp 5, and are mounted on the DC motor 2. Also, as shown in FIG. 11, an actuator arm 6 is disposed with a head 7 for reading from and writing to the magnetic disk 3, the aforementioned head being mounted on the end of the aforementioned arm.

The cover 8 shown in FIG. 10A and 10B encloses the abovementioned constituent elements. The cover 8 comprises a recessed portion; a damping plate 9 is attached to the outer surface thereof using an element made of a viscoelastic material. In this way, noise generated by the magnetic disk apparatus can be suppressed to a certain extent.

The performance of such magnetic disk apparatuses has improved markedly in recent years, but further noise reductions are required.

Also, higher density storage capacities and increased access speeds for the magnetic disk apparatuses are required. One method of increasing the density of storage capacity may be to reduce the track pitch on the magnetic disk, for example. One method of increasing access speed may be to raise the speed of rotation of the magnetic disk.

However, simply narrowing the track pitch on the magnetic disk, or simply raising the speed of rotation of the magnetic disk, results in decreases in the signal to noise (S/N) ratio of the positioning error signal, which indicates the displacement of the head in relation to the track. One cause of this is known to be the disk resonance due to disk rotation. The position detection precision of the heads drops due to the decrease in the S/N ratio of the positioning error signal so that the probability of operating errors such as reading errors becomes high. Consequently, means for suppressing magnetic disk resonance are being sought.

Furthermore, a magnetic disk in a magnetic disk apparatus is attached with a disk clamp as discussed above. However, there is a risk that the position of the magnetic disk will be displaced within the magnetic disk apparatus by a shock or the like (the displacement is in units of microns). Major problems such as errors in accessing the magnetic disk occur as a result of the displacement of the position of the magnetic disk. Improvement to the shock-resistance performance is also required for this reason.

SUMMARY OF THE INVENTION

It is an object of the present invention to provide a magnetic disk apparatus with various improvements for noise reduction, suppression of magnetic disk resonance, and improvements in shock-resistance performance.

In order to achieve the abovementioned object, a first invention relating to the present invention provides a magnetic disk apparatus comprising a motor mounted on a base; at least one magnetic disk mounted on the motor; an arm having at least one head for reading and writing information to the magnetic disk and turning so as to traverse the surface of the magnetic disk; and a cover for enclosing the motor, the magnetic disk, and the arm on the base; wherein the inner surface of the cover is opposite to the magnetic disk surface, the cover has a first recessed portion in a first region corresponding to the magnetic disk surface that is not traversed by the arm and a second recessed portion in a second region corresponding to the magnetic disk surface that is traversed by the arm, and the space between the inner surface of the first region and the magnetic disk surface becomes narrower than the space between the inner surface of the second region and the magnetic disk surface by making the depth of the first recessed portion greater than the depth of the second recessed portion.

In this way, with the first invention, the recessed portion of the cover of the magnetic disk apparatus has a two-level structure, and the space between the inner surface of the recessed portion corresponding to the region of the magnetic disk surface that is not traversed by the actuator arm and the surface of the magnetic disk is made as small as possible. The flow of air generated in that space by the rotation of the magnetic disk is thereby suppressed, and as a result, the resonance of the magnetic disk is suppressed.

The magnetic disk apparatus relating to the first invention preferably comprises a first damping plate mounted on the first recessed portion, and a second damping plate mounted on the second recessed portion and above the first damping plate. In this way, the noise level is further suppressed by having two layers of damping plates applied to the outer surface of the cover. In the magnetic disk apparatus relating to the first invention, the outer surface of the cover, whereon the first damping plate and second damping plate are mounted, is preferably essentially flat. It thereby becomes easy to attach a name plate label or the like on the upper surface of the cover.

In order to achieve the abovementioned object, the second invention relating to the present invention provides a magnetic disk apparatus comprising a motor mounted on a base; a plurality of magnetic disks mounted on the motor; spacers forming a prescribed interval between each of the magnetic disks; and heads for reading and writing information to the magnetic disks; wherein a groove element is formed on that part of the surface of the spacer which makes contact with the magnetic disk; and that groove element is made of a viscoelastic material.

For example, the spacer is ring-shaped and includes a groove element along the circumference of the surface that makes contact with the magnetic disk; a viscoelastic material element is preferably mounted in the groove element. Also, the spacer may be ring-shaped and include a groove element extending in a radial direction on the surface which makes contact with the magnetic disk; a viscoelastic material element is preferably mounted in the groove element.

In order to achieve the abovementioned object, the third invention relating to the present invention provides a magnetic disk apparatus comprising a motor mounted on a base;

at least one magnetic disk to which information is written and read by heads; and a clamp for pressing and mounting the magnetic disk on the supporting portion of the motor, wherein at least part of the surface of the clamp in contact with the magnetic disk is made of a viscoelastic material.

In order to achieve the abovementioned object, the fourth invention relating to the present invention provides a magnetic disk apparatus comprising a motor mounted on a base; at least one magnetic disk to which information is written and read by heads; and a clamp for pressing and mounting the magnetic disk on the supporting portion of the motor, wherein at least part of the surface of the supporting portion of the motor in contact with the magnetic disk is made of a viscoelastic material.

In order to achieve the abovementioned object, the fifth invention relating to the present invention provides a magnetic disk apparatus comprising a motor mounted on a base; a plurality of magnetic disks mounted on the motor; ring-shaped spacers forming a prescribed interval between each of the magnetic disks; O-rings disposed around the spacers and in contact with the magnetic disks; and heads for reading and writing information to the magnetic disks.

In this way, with the second, third, fourth, and fifth inventions, viscoelastic material elements, O-rings, or the like are placed in contact with the magnetic disks. These suppress the resonance of the magnetic disks.

In order to achieve the abovementioned object, the sixth invention relating to the present invention provides a magnetic disk apparatus comprising at least one magnetic disk; a motor for rotating the magnetic disk; a disk-shaped clamp for mounting the magnetic disk on the motor by screw fastening; a C-shaped balancer for adjusting the rotary balance of the magnetic disk and mounted on the outer surrounding portion of the clamp; and a head for reading and writing information to the magnetic disk.

With the sixth invention, it becomes unnecessary to create different levels on the clamp surface in order to mount on the clamp a balance-adjusting weight, which is conventionally used. Consequently, the rigidity of the clamp is increased because the clamp can be made thicker and, as a result, the shock-resistance performance of the magnetic disk apparatus can be improved.

BRIEF DESCRIPTION OF THE DRAWINGS

FIGS. 1A and 1B are drawings showing the magnetic disk apparatus relating to a first embodiment of the present invention;

FIGS. 5A and 5B are drawings showing a first example of the second embodiment;

FIGS. 6A and 6B are drawings showing a second example of the second embodiment;

FIGS. 10A and 10B are drawings showing a magnetic disk apparatus; and

FIG. 11 is a view from above of the magnetic disk apparatus when the cover 8 is removed.

DESCRIPTION OF THE PREFERRED EMBODIMENTS

Figure 2A:
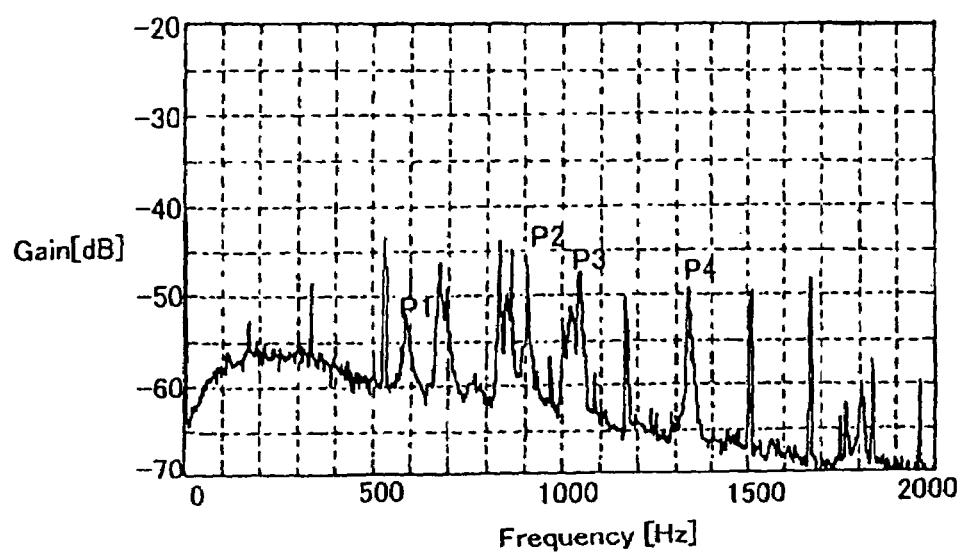
FIGS. 2A and 2B are graphs of the frequency change of the positioning error signal.

The preferred embodiments of the present invention are explained below. However, the technical scope of the present invention is not limited to these embodiments.

FIGS. 1A and 1B are drawings showing the magnetic disk apparatus relating to the first embodiment of the present invention. FIG. 1A is a cross sectional view of the magnetic disk apparatus and FIG. 1B is a view from above. In the magnetic disk apparatus in FIGS. 1A and 1B, as in FIGS. 10A and 10B, at least one magnetic disk 3 is mounted so as to rotate about the center of the DC motor 2 mounted on the base 1. In FIG. 1A, five magnetic disks 3, for example, with spacers 4 fitted between them are pressed together by screw fastening using the disk clamp 5, and are attached to the DC motor 2. Also, with the turning of the actuator arm 6 shown in FIG. 11, the head 7 mounted on the end of the arm 6 traverses the tracks on the magnetic disk 3 and comes to be positioned above an arbitrary track.

The cover 8 encloses the abovementioned constituent elements. Two damping plates 9, 10 are attached in layers to the outer surface of the cover 8. The cover 8 has a recessed portion and the damping plates 9, 10 are attached in that recessed portion. The thicknesses of the damping plates 9, 10 are adjusted so that the outer surface of the magnetic disk apparatus becomes flat. The outer surface of the magnetic disk apparatus is made flat so that a name plate label or the like can be easily attached thereto. Also, the damping plates 9, 10 are made of metal or resin and are attached to the cover 7 with a viscoelastic material element. The viscoelastic material element is double-sided tape, for example.

More specifically, the recessed portion of the cover 8 in the first embodiment has a two-level structure and comprises a first recessed portion 81 and second recessed portion 82. The first recessed portion 81 is deeper than the second recessed portion. The first recessed portion 81 is formed over the magnetic disk surface at least in a region where the actuator arm 6 does not traverse the magnetic disk 3. The second recessed portion 82 is formed over a region where the actuator arm 6 does traverse the magnetic disk 3. Consequently, the space d2 between the inner surface of the second recessed portion 82 of the cover 8 and the surface of the magnetic disk 3 opposite thereto must be a space through which the actuator arm 6 can pass. Meanwhile, because the actuator arm 6 does not traverse the first recessed portion 81, the space d1 between the inner surface of the first recessed portion 81 and the surface of the magnetic disk 3 opposite thereto is made as narrow as possible, because it is not necessary to establish space for the height of the head 7. The space d1 is 0.5 mm, for example. In other words, the depth of the first recessed portion 81 is deeper, at most by the height of the head 7, than the depth of the second recessed portion 82.

In the first embodiment, the damping plate 10, with a thickness corresponding to the step between the first recessed portion 81 and the second recessed portion 82, is attached to the first recessed portion 81. The damping plate 9, with a thickness corresponding to the depth of the second recessed portion 82, is attached to the damping plate 10 and the second recessed portion 82. Consequently, the two damping plates 9, 10 are attached in layers over the first recessed portion 81. Also, the damping plate 10 has a shape that matches the first recessed portion 81, specifically a C-shape. The damping plate 9 has a shape that is a combination of the first recessed portion 81 and the damping plate 10, and has at least a shape that covers the magnetic disk 3.

As shown in FIGS. 10A and 10B, the recessed portion of a conventional cover 8 has a single level structure. The depth of the first recessed portion 81 is the same as the depth of the second recessed portion 82, and a single damping plate 9 is attached to the first recessed portion 81 and second recessed portion 82.

Meanwhile, in the first embodiment of the present invention, the first recessed portion 81 has a depth greater than that of the second recessed portion 82, and a damping plate 10 of a thickness corresponding to that step is added. By making the first recessed portion 81 deeper, the space between the inner surface of the first recessed portion 81 and the surface of the magnetic disk 3 opposite thereto becomes narrower than the space between the inner surface of the second recessed portion 82 and the surface of the magnetic disk 3 opposite thereto. The generation of air flow between the inner surface of the cover 8 and the surface of the magnetic disk 3 opposite thereto due to the rotation of the magnetic disk 3 can thereby be suppressed. This air flow is a cause of magnetic disk 3 resonance; the resonance of the magnetic disk 3 can be suppressed by suppressing the generation of the air flow.

Figure 2B:
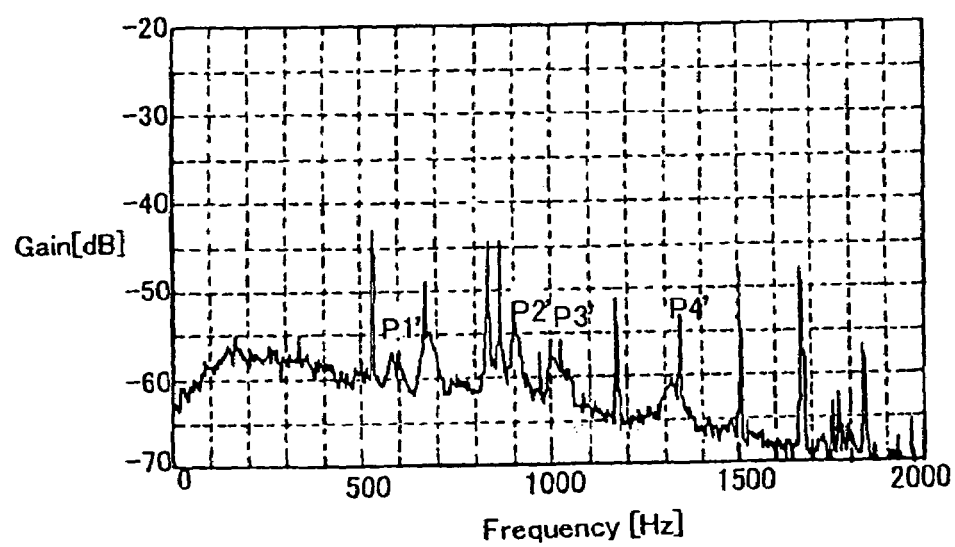

FIGS. 2A and 2B are graphs of the change in frequency of the positioning error signal. FIG. 2A is an example of a graph of the change in frequency of the positioning error signal for a conventional magnetic disk apparatus; FIG. 2B is an example of a graph of the change in frequency of the positioning error signal for a the first embodiment of the present invention. Moreover, the vertical axis of the graph shows the gain (dB) of the positioning error signal. In FIG. 2A, the peaks P1, P2, P3, P4 seen at frequencies from 500 Hz to 1500 Hz are part of peaks due to magnetic disk resonance. In FIG. 2B, these peaks P1 to P4 correspond to peaks P1' to P4' respectively and the resonance levels are clearly reduced. Specifically, the resonance levels are improved by 5 dB or more.

Figure 3:
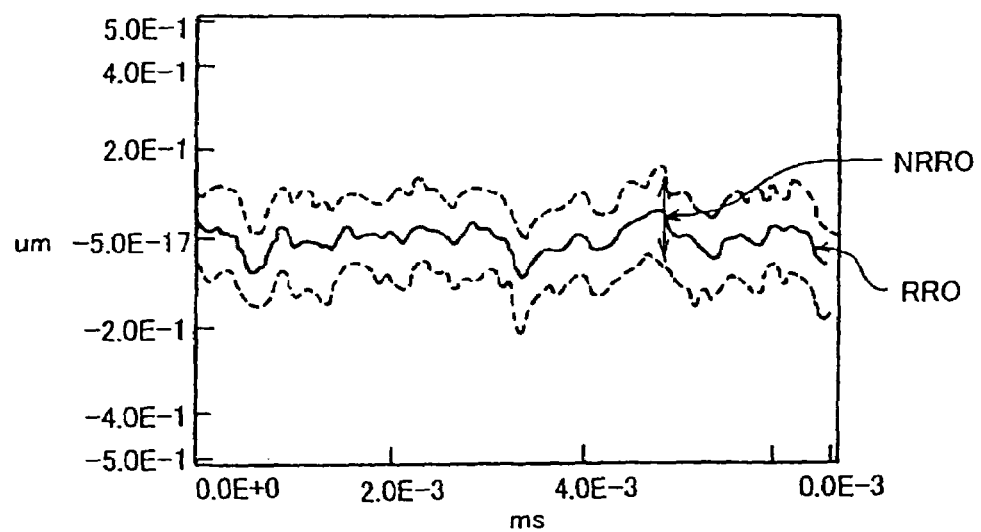
FIG. 3 is a graph of the change in the positioning error signal over time.

FIG. 3 is a graph of the change over time of the positioning error signal. The vertical axis of the graph is the amplitude (μm) in a circumferential direction on the magnetic disk 3. In FIG. 3, the solid line RRO shows the mean value of the positioning error signal in rotation, for a plurality of revolutions of the magnetic disk 3 (128 revolutions in FIG. 3). The two dotted lines show the maximum and minimum values of the positioning error signal amended for a plurality of revolutions; this amplitude is NRRO. A greater value for the NRRO indicates greater influence on the adjoining tracks. In other words, the track pitch can be reduced further as NRRO becomes smaller and the track density can be increased. In tests by the inventors, the maximum amplitude of NRRO was reduced to 0.183 μm from 0.212 μm of the conventional art, a 13% improvement.

Also, through making the first recessed portion 81 deeper, the damping plates 9, 10 can be attached in two layers in the first recessed portion 81. Noise generated by the magnetic disk apparatus can thereby be further suppressed compared to the conventional art. Also, the damping plates can attenuate different noise frequencies because the thickness, form, and area of the damping plates 9, 10 are different.

Figure 4:
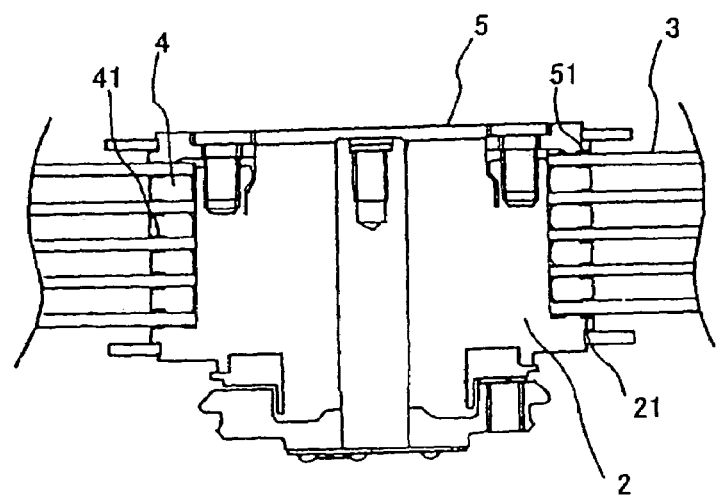
FIG. 4 is a drawing explaining the magnetic disk apparatus relating to the second embodiment of the present invention.

FIG. 4 is a drawing explaining the magnetic disk apparatus relating to the second embodiment of the present invention. Specifically, FIG. 4 shows a first example of the second embodiment applied to the portion of the magnetic disk apparatus encircled by a dotted line in FIGS. 1A and 1B. In the first example of the second embodiment, in the case where the magnetic disk apparatus comprises a plurality of magnetic disks 3, that part of the surfaces of the spacers 4, which have the purpose of maintaining prescribed spaces between each of the magnetic disks 3, which is in contact with the magnetic disks 3 is made of a viscoelastic material.

FIGS. 5A and 5B are drawings showing a spacer 4 in the first example. FIG. 5A shows a view from above and FIG. 5B shows a side view. As shown in FIGS. 5A and 5B, groove elements 41 are disposed along the edge on the peripheral portion of the upper and lower surfaces of the spacer 4; viscoelastic material elements 42 are mounted in the groove elements 41. The viscoelastic material elements 41 are double-sided tape, for example, and are attached to the groove elements 41. The conventional spacers 4 are entirely constituted of a metal such as aluminum, for example, and cannot absorb the vibrations of the magnetic disks 3. In the second embodiment, the resonance of the magnetic disks 3 is suppressed by virtue of the fact that the parts of the upper and/or lower surfaces of the spacers 4 which contact the magnetic disks 3 are made of viscoelastic material.

Moreover, when the entire spacer 4 is constituted of viscoelastic material, or viscoelastic material elements are attached to the entire upper or lower surface of the spacer 4, the height dimension of the spacer 4 changes as a result of the spacers 4 being compressed in the height direction by the disk clamp 5 and the spacer cannot maintain the prescribed space between the magnetic disks 3. In other words, the dimensional precision of the spacer 4 deteriorates. Consequently, in the second embodiment, the same dimensional precision of the spacer 4 as in the conventional art can be maintained by attaching the viscoelastic material elements 42 in the groove elements 41 formed in part of the upper and/or lower surfaces of the spacer 4. Moreover, the groove elements 41 may also be formed in both or either of the upper and lower surfaces of the spacer 4.

Also, as shown in FIG. 4, a groove element 51 may further be formed in the peripheral portion of the lower surface of the disk clamp 5 contacting the magnetic disk 3; and a groove element 21 may be formed in the magnetic disk supporting portion of the DC motor 2 which contacts the magnetic disk 3. A viscoelastic material element, with a thickness corresponding to that step, is mounted in each groove element 51, 21 as in the groove element 41 in the spacer 4. The resonance of the magnetic disk 3 is suppressed because the vibration due to the rotation of the magnetic disk 3 is attenuated thereby.

FIGS. 6A and 6B are drawings showing a second example of the spacer 4 in the second embodiment. FIG. 6A is a view from above and FIG. 6B is a side view. In the second example, groove elements 41 are formed in a direction crossing part of the upper and/or lower surfaces of the spacer 4 (radial direction). Viscoelastic material 42, with a thickness corresponding to that step, is affixed therein.

Figure 7:
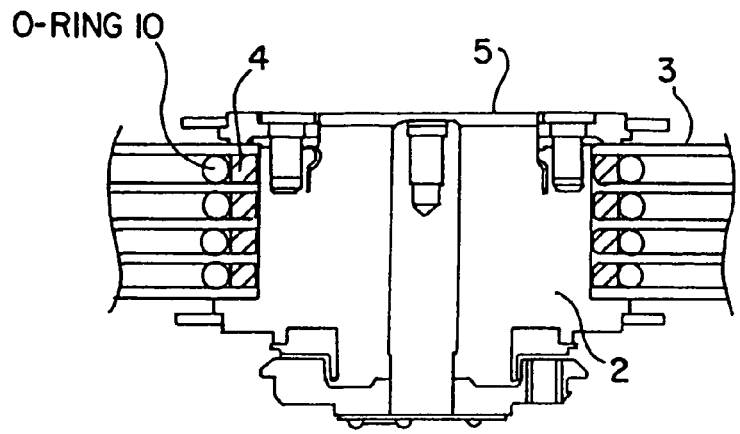
FIG. 7 is a drawing showing a third example of the second embodiment.

FIG. 7 is a drawing showing a third example of the second embodiment. Specifically, FIG. 7 shows the third example of the second embodiment applied to the portion of the magnetic disk apparatus encircled by a dotted line in FIGS. 1A and 1B. In the third example of the second embodiment, an O-ring 10 is disposed on the outer side of the spacer 4. The diameter of the O-ring 10 is the same as or slightly greater than the height of the spacer 4. When the diameter of the O-ring 10 is slightly greater than the height of the spacer 4, the height of the O-ring 10 matches the height of the spacer 4, due to compression with the disk clamp 5, and contacts the magnetic disk 3. The rotary vibration of the magnetic disk 3 is absorbed thereby. The material of the O-ring 10 is butyl rubber, polyurethane rubber, α-gel, or the like.

Figure 8A:
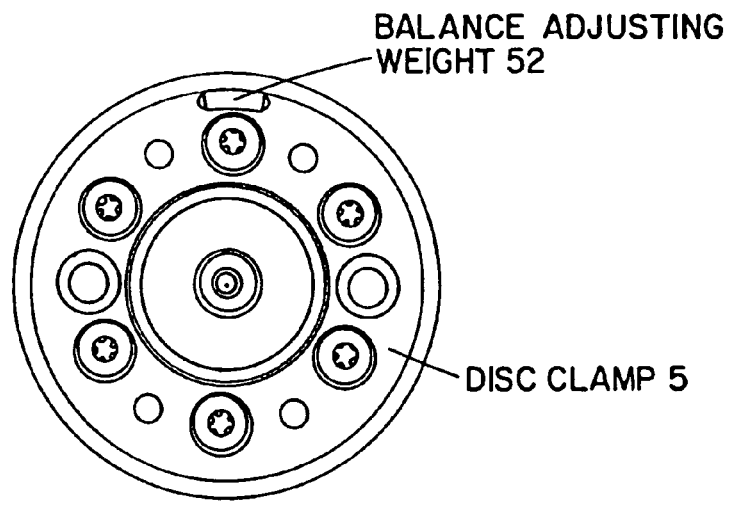
FIGS. 8A and 8B are drawings showing a conventional disk clamp.
Figure 8B:
Figures 9A, 9B:
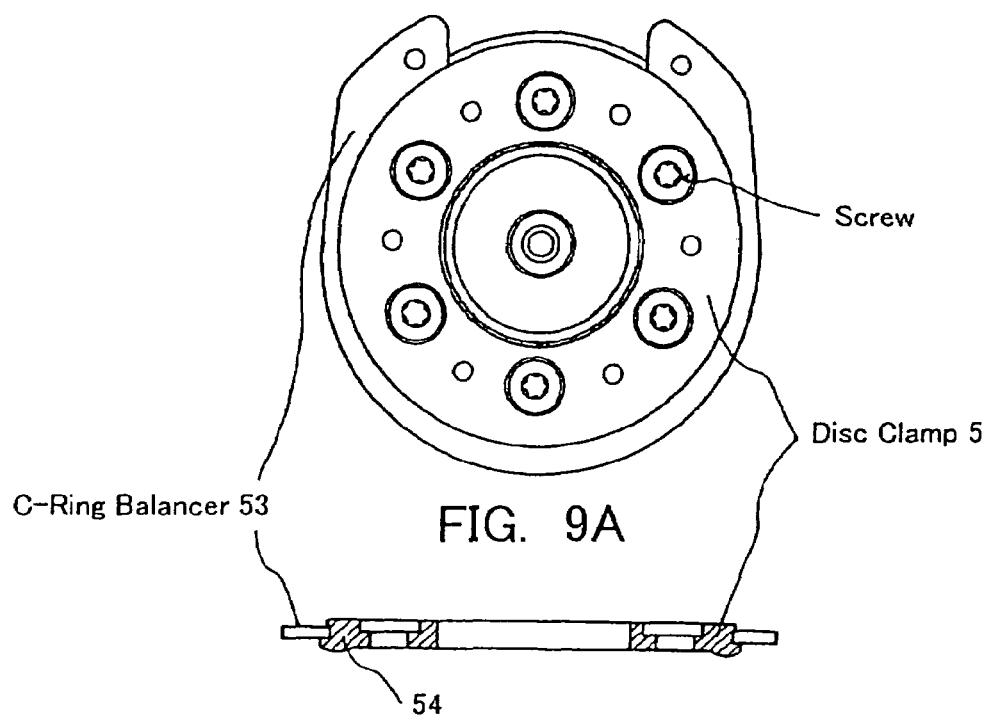
FIGS. 9A and 9B are drawings showing a disk clamp relating to the third embodiment of the present invention.

The third embodiment of the present invention is explained next. The third embodiment relates to an improvement of the disk clamp 5 of the magnetic disk apparatus in FIGS. 1A and 1B. FIGS. 8A and 8B are drawings showing a conventional disk clamp. FIG. 8A is a view from above and FIG. 8B is a cross sectional view. FIGS. 9A and 9B are drawings showing the disk clamp relating to the third embodiment of the present invention. FIG. 9A is a view from above and FIG. 9B is a cross sectional view.

As shown in FIGS. 8A and 8B, a step is formed in the upper surface of the conventional disk clamp 5. A balance adjusting weight 52, that functions as a balancer for securing the rotary balance of the magnetic disk, is attached with adhesive along the inner wall 51 of that step. In other words, it is necessary for the disk clamp 5 to have a thick portion and a thin portion to make the wall 51 of the step in order to attach the weight 52.

Meanwhile, the disk clamp 5 attaches the magnetic disk 3 to the DC motor 2 with clamping force from screw fastening. Consequently, it is necessary to increase this clamping force to improve the shock-resistance performance of the magnetic disk apparatus. To improve this clamping force, it is necessary to increase the rigidity of the disk clamp 5, for example. One means for that purpose may be to make the disk clamp 5 as thick as possible.

Consequently, in the third embodiment of the present invention, the step 51 to which the weight 52 is attached is eliminated and the thin portion of the conventional disk clamp 5 is made thick as shown in FIGS. 9A and 9B. The balance of the disk clamp 5 in a circumferential direction is adjusted with a C-ring balancer 53, mounted on the periphery of the disk clamp 5, instead of the weight 52. The balance of the disk clamp 5 is adjusted by adjusting the orientation of the C-ring balancer 53. The C-ring balancer 53 is formed of metal or resin, for example.

More specifically, as shown in FIG. 9B, a groove element 54 into which the C-ring balancer 53 is fit is formed in the peripheral side portion of the disk clamp 5. Also, the disk clamp 5 is made thick across the entire region in a radial direction because a step is not formed thereon in a radial direction.

Also, the process for fitting the C-ring balancer 53 into the disk clamp 5 is easier than the process for attaching the weight 52 to the disk clamp 5 and the process for manufacturing the disk clamp 5 can be simplified.

According to experiments by the inventors, the clamping force of the disk clamp 5 was increased by approximately 50% by thickening the disk clamp 5 and as a result the shock-resistance performance was increased by approximately 20%.

As described above, in the present invention, the recessed portion of the cover of the magnetic disk apparatus has a two-level structure; the space between the inner surface of the recessed portion, corresponding to the region of the magnetic disk surface which the actuator arm does not traverse, and the surface of the magnetic disk is made as narrow as possible. The air flow generated in that space by the rotation of the magnetic disk is thereby suppressed and as a result, magnetic disk resonance is suppressed. Also, the noise level is further suppressed by having two layers of damping plates attached to the outer surface of the cover.

When the magnetic disk apparatus comprises a plurality of magnetic disks, viscoelastic material is used to form the part of the surface which is in contact with the magnetic disks of spacers which produce a prescribed space between each of the magnetic disks. Furthermore, at least those parts of the motor for rotating the magnetic disks and the disk clamp for mounting the magnetic disks on the motor that are in contact with the magnetic disks are made of viscoelastic material. The magnetic disk resonance is suppressed thereby.

Furthermore, in order to adjust the rotary balance of the magnetic disk, a C-ring balancer having a C-shaped form is mounted on the peripheral portion of the disk clamp. It thereby becomes unnecessary to make a step in the clamp surface in order to mount a conventionally used, balance-adjusting weight on the clamp. Consequently, because the clamp can be made thick, the rigidity of the clamp is increased and as a result, the shock-resistance performance of the magnetic disk apparatus can be improved.

The scope of the present invention is not limited to the embodiments discussed above and extends to inventions noted in the claims and items equivalent thereto.

What is claimed is:

1. A magnetic disk apparatus for reading and writing information to a magnetic disk comprising:
   a motor for rotating the magnetic disk mounted thereon;
   a disk-shaped clamp for mounting the magnetic disk on the motor by screw fastening; and
   a C-shaped balancer for adjusting the rotary balance of the magnetic disk and mounted on the outer surrounding portion of the clamp,
   wherein the C-shaped balancer has a generally rectangular cross-section.

2. The magnetic disk apparatus according to claim 1, wherein a groove element is formed in the side of the outer surrounding portion of the clamp, and the C-shaped balancer is fit into the groove element.

* * * * *